(12) United States Patent
McKenzie et al.

(10) Patent No.: US 10,347,053 B2
(45) Date of Patent: Jul. 9, 2019

(54) METHODS AND APPARATUS TO PROJECT CONTACT WITH REAL OBJECTS IN VIRTUAL REALITY ENVIRONMENTS

(71) Applicant: Google Inc., Mountain View, CA (US)

(72) Inventors: Chris McKenzie, Brooklyn, NY (US); Adam Glazier, Oakland, CA (US); Clayton Woodward Bavor, Jr., Atherton, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/598,067

(22) Filed: May 17, 2017

(65) Prior Publication Data

US 2017/0337750 A1     Nov. 23, 2017

Related U.S. Application Data

(60) Provisional application No. 62/337,434, filed on May 17, 2016.

(51) Int. Cl.
*G06T 19/00* (2011.01)
*G06T 19/20* (2011.01)
(Continued)

(52) U.S. Cl.
CPC ............ *G06T 19/20* (2013.01); *G02B 27/017* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS

2007/0016265 A1*  1/2007  Davoodi ................... A61F 2/68
                                                                    607/48
2015/0243079 A1*  8/2015  Cho ..................... G02B 27/017
                                                                    345/633

(Continued)

FOREIGN PATENT DOCUMENTS

WO     2013052855 A2    4/2013
WO     2016014877 A1    1/2016

OTHER PUBLICATIONS

Mertz, "How to avoid Real Objects While in a Virtual World", MIT Technology Review, retrieved on Mar. 16, 2017 from https://www.technologyreview.com/s/538336/how-to-avoid-real-objects-while-in-a-virtual-world, Jun. 12, 2015, 7 pages.

(Continued)

*Primary Examiner* — Nicholas R Wilson
(74) *Attorney, Agent, or Firm* — Brake Hughes Bellermann LLP

(57) ABSTRACT

Techniques disclosed herein involve adaptively or dynamically displaying virtual objects in a virtual reality (VR) environment, and representations, within the VR environment, of physical objects in the physical environment, i.e., outside the VR environment, in order to alert users within the VR environment. For example, if a projected movement of a user indicates that the user will move close to a physical object in the physical world, the representation of the physical object changes from an un-displayed state, in which the physical object is not visible in the VR environment, to a displayed state in which the physical object is at least partially depicted inside the VR environment. In this way, what is displayed inside the VR environment can include both virtual objects as well representations of physical objects from the physical space.

20 Claims, 9 Drawing Sheets

(51) Int. Cl.
*G06F 3/01* (2006.01)
*G06F 3/038* (2013.01)
*G06F 3/048* (2013.01)
*G02B 27/01* (2006.01)

(52) U.S. Cl.
CPC .............. *G06F 3/016* (2013.01); *G06F 3/038* (2013.01); *G06F 3/048* (2013.01); *G06T 19/006* (2013.01); *G06F 2203/04804* (2013.01)

(56) References Cited

U.S. PATENT DOCUMENTS

| | | | | |
|---|---|---|---|---|
| 2016/0027212 A1* | 1/2016 | Da Veiga | ........... | G02B 27/0172 345/633 |
| 2016/0124502 A1* | 5/2016 | Sawyer | ................ | G02B 27/017 345/633 |
| 2016/0171771 A1* | 6/2016 | Pedrotti | ............... | G02B 27/017 345/633 |
| 2016/0335808 A1* | 11/2016 | Novak | .................. | G06T 19/006 |

OTHER PUBLICATIONS

Occipital HQ, "Bridge Engine Demo: Occipital at CES 2016", retrieved on Jul. 24, 2017, from www.youtube.com/watch?v=cEnnbCSbijo, Jan. 14, 2016, 6 pages.
International Search Report and Written Opinion for PCT Application No. PCT/US2017/033153, dated Aug. 1, 2017, 15 pages.
International Preliminary Report on Patentability for International Application No. PCT/US2017/033153, dated Nov. 29, 2018, 8 pages.

* cited by examiner

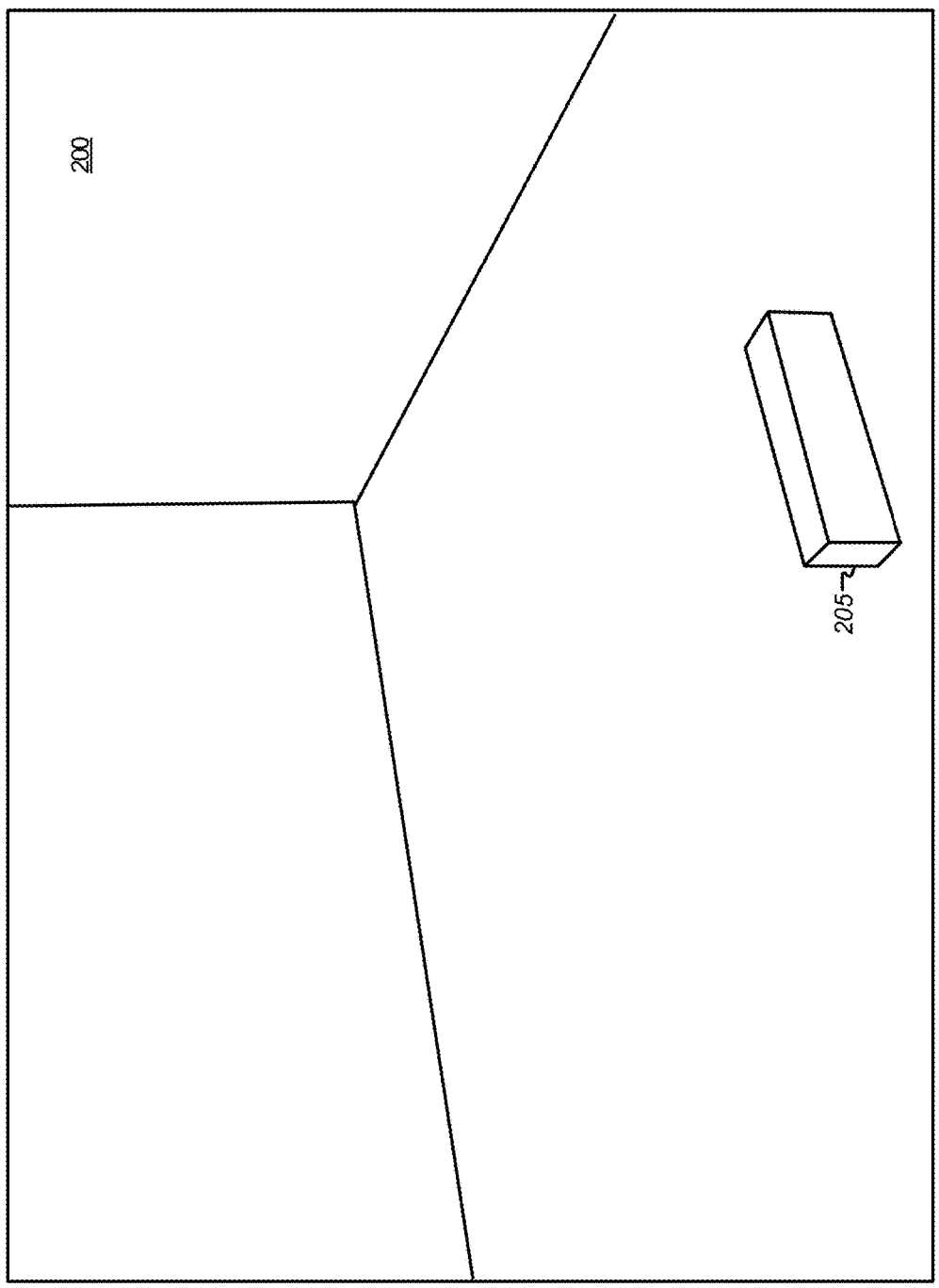

METHODS AND APPARATUS TO PROJECT CONTACT WITH REAL OBJECTS IN VIRTUAL REALITY ENVIRONMENTS

CROSS REFERENCE TO RELATED APPLICATION

This application claims priority to U.S. Provisional Application No. 62/337,434, filed on May 17, 2016, the disclosure of which is incorporated herein by reference in its entirety.

FIELD OF THE DISCLOSURE

This disclosure relates generally to virtual reality (VR) environments, and, more particularly, to methods and apparatus to project contact with real objects in VR environments.

BACKGROUND

VR environments provide users with applications and components which they can use to interact with virtual objects. In some instances, VR environments include representations of real objects with which a user may have contact while immersed in the VR environments.

BRIEF DESCRIPTION OF THE DRAWINGS

FIG. 2A is an illustration of an example physical environment shown from a first location.

DETAILED DESCRIPTION

Figure 1:
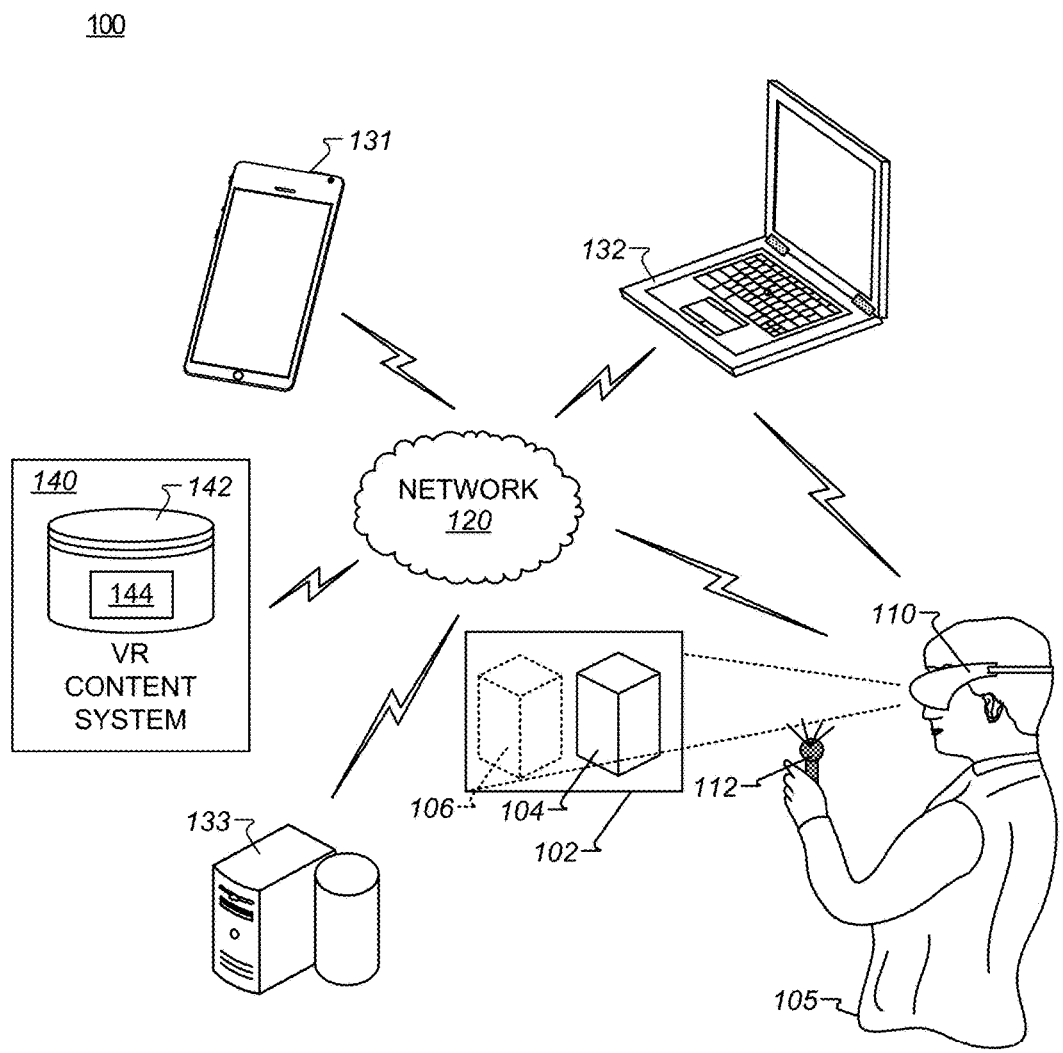
FIG. 1 is a block diagram of an example VR system that may be used to project contact with real objects in VR environments in accordance with this disclosure.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Turning to FIG. 1, a block diagram of an example virtual reality (VR) system 100 for creating and interacting with a three-dimensional (3D) VR environment 102 in accordance with the teachings of this disclosure is shown. In general, the system 100 provides the VR environment 102, and VR content that enable a user to access, view, use and/or interact with the VR environment 102. The VR system 100 can provide the user with options for accessing the content, applications, virtual objects, real objects, and VR controls using, for example, actual and projected movement within the VR environment. The example VR system 100 of FIG. 1 includes a head-mounted display (HMD) 110 worn by a user 105, and a handheld controller 112 held by the user 112. The example VR environment 102 shown in FIG. 1 is a representation of the images being displayed for the user inside their HMD 110.

The example VR environment 102, in accordance with this disclosure, can include a virtual object 104 as well as a representation of a real (e.g., non-virtual, physical, actual, etc.) object 106 that is normally not seen or visible while the user is operating within the VR environment 102 as displayed inside their HMD 110. In other words, the real object 106 shown in the VR environment 102 represents a physical object while the virtual object 104 may not represent a physical object in the physical world. For instance, the real object 106 may represent a physical object that is present in a room in which a user is operating their HMD 110 and, thus, interacting within the VR environment 102. When the real object 106 is not shown to the user in their HMD 110, as the user navigates within the VR environment 102, the user may have unintended or un-anticipated contact with the physical object represented by the real object 106. Such inadvertent contact may decrease customer satisfaction and/or may result in user injury.

Accordingly, the examples disclosed herein adaptively or dynamically display virtual objects, and real objects 106 that are representations, within the VR environment 102, of physical objects outside the VR environment 102 in order to alert users from within the VR environment 102. In that way, for example, the risk of unintended or un-anticipated contact of the user with the real object can be reduced, thus reducing also the risk of possible injury of the user due to a collision with the real object. For instance, if a projected movement of a user or a portion thereof indicates that the user will move close (e.g., within a threshold criteria or distance, within a small distance) to a physical object in the physical world, the real object 106, which is a representation of the physical object, changes from an un-displayed state, in which the real object 106 is not visible (e.g., substantially not visible) in the VR environment 102 (e.g., within the VR environment 102 on a display within the HMD 110), to a displayed state in which the real object 106 is at least partially depicted in the VR environment 102. In this way, what is displayed in the VR environment 102 can include both objects in the VR environment 102 as well the physical object (represented as real object 106) from the physical space in which the user is operating the HMD 110.

Figure 2B:
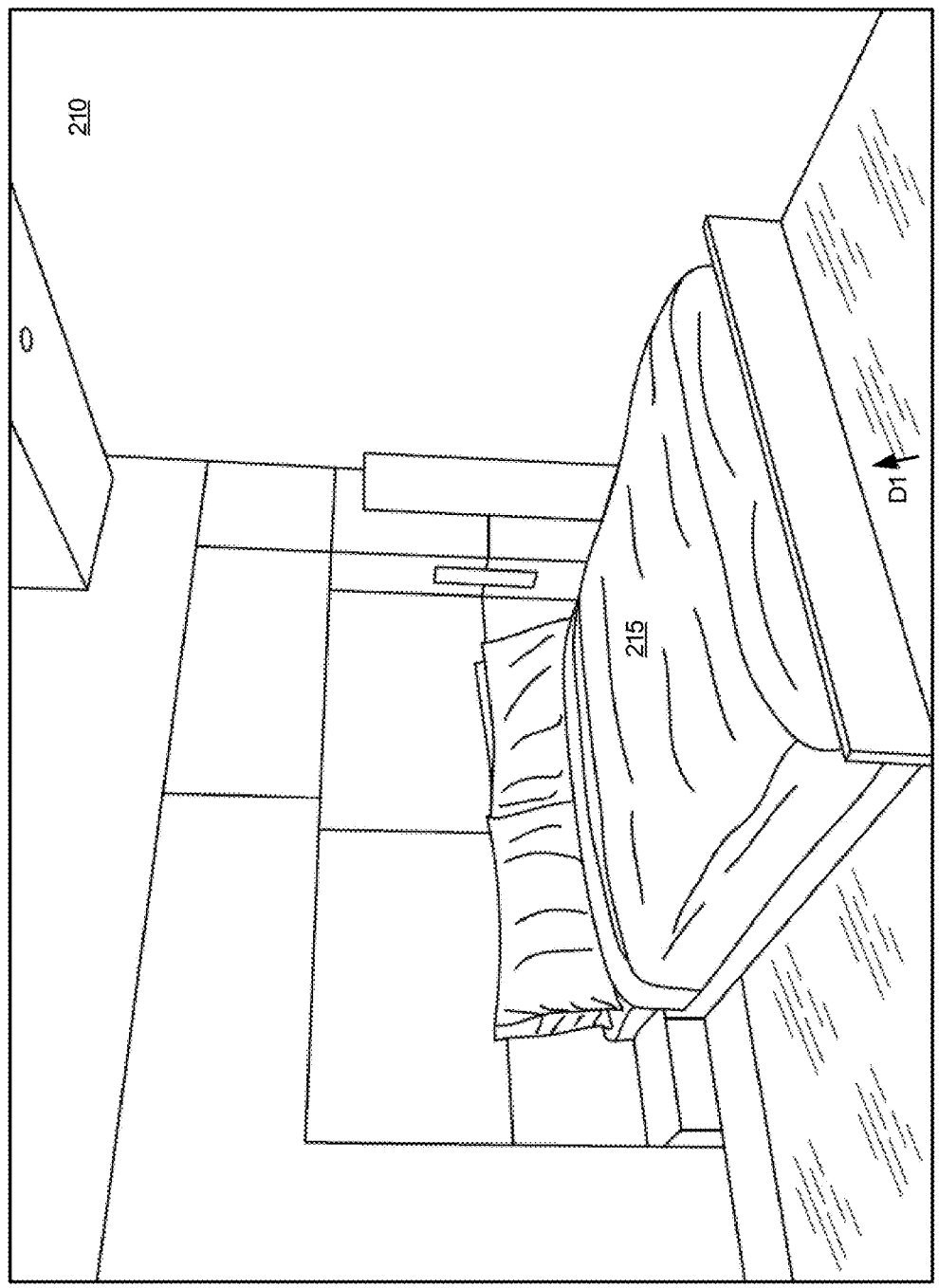
FIG. 2B is an illustration of an example VR environment shown from a first location.

For example, FIG. 2A illustrates a physical room 200 including a physical or real object in the form of a chest 205. The physical room 200 represents a physical space in which a user may physically move as they interact with a VR environment displayed inside their HMD. FIG. 2B illustrates a virtual room 210 displayed inside the user's HMD, the virtual room 210 including virtual objects in the form of, for example, a virtual bed 215. In FIG. 2B, the user of the HMD is a distance (not shown) from the bed 215.

Figure 2C:
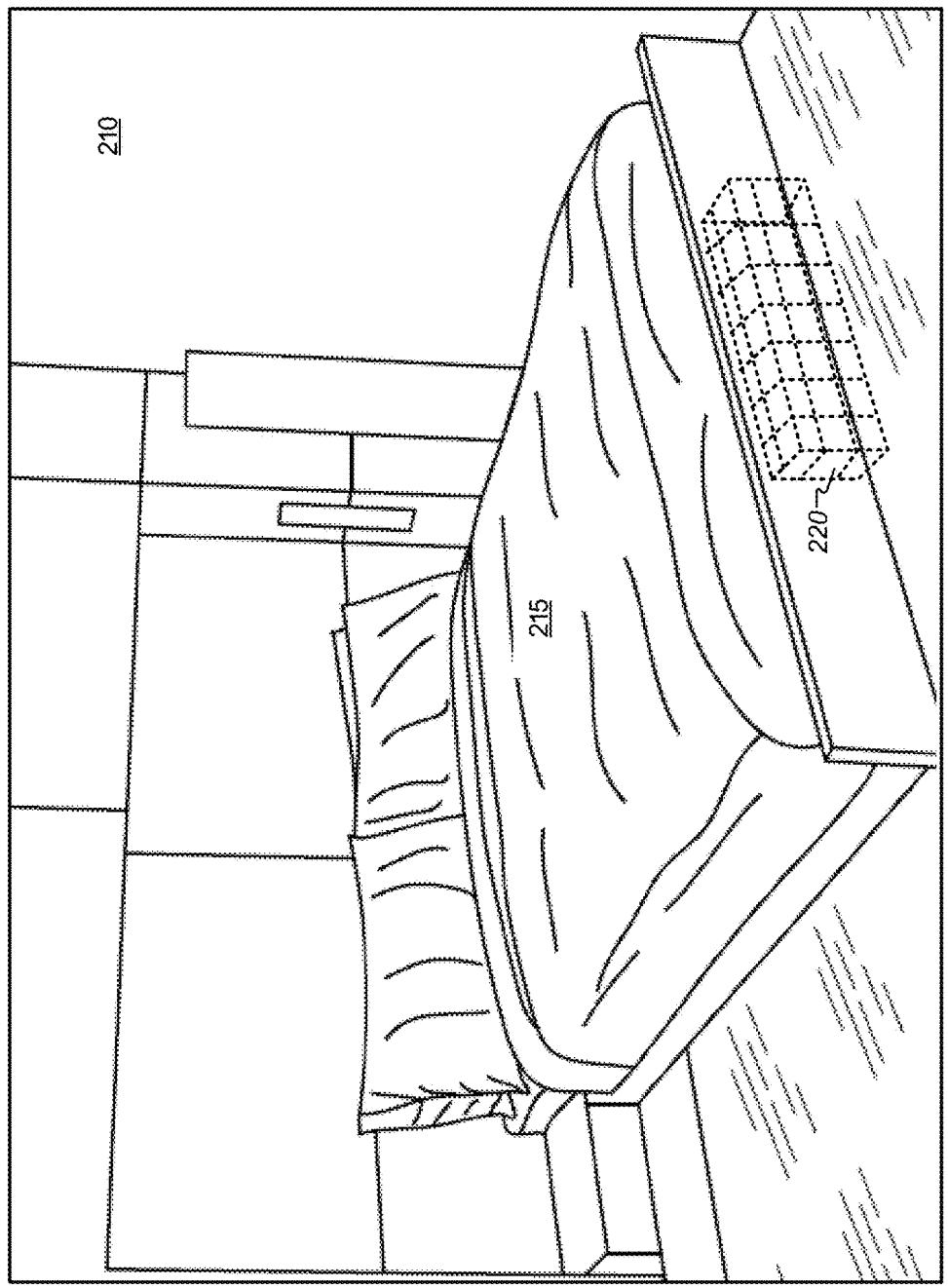
FIG. 2C is an illustration of the example VR environment of FIG. 2B shown from a second location.

If the user of the HMD moves, or is projected to move, along, for example, direction D1 close enough to the foot of the virtual bed 215 they also move, or are projected to move, close to the physical chest 205 in the physical room 200. This results in a virtual representation of the physical chest 205 as virtual chest 220 being shown in the VR environment 210 inside the user's HMD, as shown in FIG. 2C.

In this way, the user is made aware inside their HMD that the chest 205 is in their projected path of movement so action may be taken to avoid contact. As shown in FIG. 2C, the virtual chest 220 can be shown in a partially visible state.

Example partially visible states can include, but are not limited to, a partially opaque state, a partially transparent state, a displayed state in a wire frame representation, etc. When in the partially visible state another object, real or virtual, and in the VR environment can be at least partially viewed through the displayed representation of the real object.

In some examples, a threshold is used to determine when to at least partially display real objects. More generally speaking, one may specify one or more conditions, including the attainment of such a threshold, under which real objects that represent physical objects may be displayed in a VR environment. Example thresholds include, but are not limited to, a distance between a projected movement and a real object, a projected time to reach the real object, a projected probability of contact, etc. If the user is projected to move away from the real object as determined by calculating a projected movement. The real object may revert to not being visible inside the HMD in response to the calculated projected movement. By using thresholds, real objects can be displayed in partially visible states for a small distance about the user. In some implementations, different thresholds are used to different objects and/or types of objects. In some implementations, any movement of the user in the same room as a physical object may cause the real object 106 to be displayed in the VR environment.

Referring back to FIG. 1, the example VR system 100 includes any number of computing and/or electronic devices that can exchange data over a network 120. The devices may represent clients or servers, and can communicate via the network 120 or any other additional and/or alternative network(s). Example client devices include, but are not limited to, a mobile device 131 (e.g., a smartphone, a personal digital assistant, a portable media player, etc.), an electronic tablet (not shown), a laptop or netbook 132, a camera (not shown), the HMD 110, a desktop computer 133, the VR handheld controller 112, a gaming device (not shown), and any other electronic or computing devices that can communicate using the network 120 or other network(s) with other computing or electronic devices or systems, or that may be used to access VR content or operate within a VR environment. The devices 110, 112 and 131-133 may represent client or server devices. The devices 110, 112 and 131-133 can execute a client operating system, and one or more client applications that can access, render, provide, or display VR content on a display device included in or in conjunction with each respective device 110, 112 and 131-133.

Figure 3:
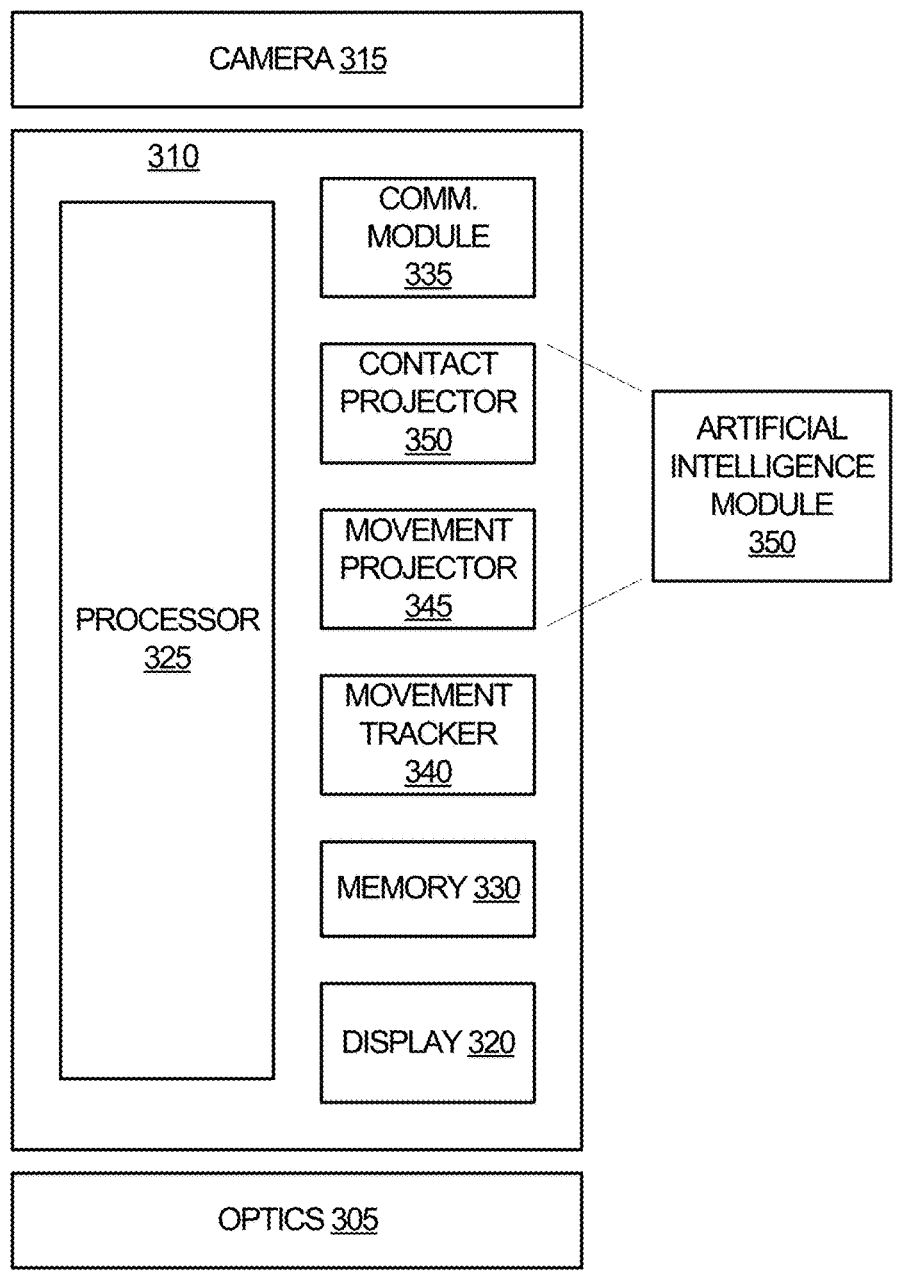
FIG. 3 is a schematic diagram that illustrates an example head-mounted display (HMD) in accordance with the teachings of this disclosure.

FIG. 3 is a schematic diagram of an example HMD 300 that may be used, among other things, to implement the example HMD 110 of FIG. 1. The example HMD 300 of FIG. 3 includes an optics module 305, a processor module 310, and an outward or forward facing camera 315.

The optics module 305 includes, but is not limited to, lenses, mirrors, coatings, apertures, etc. that enable a wearer of the HMD 300 to view a display 320. The example display 320 displays side-by-side images and/or videos for respective eyes of a wearer of the HMD 300. In other examples, two (or more) of the display 320 are used to collectively display, respectively, the side-by-side images and/or videos.

The modules 305, 310 and 315, and the elements therein may be implemented using any number and/or type(s) of components and/or machine-readable instructions. In some examples, the processor module 310 is implemented using a mobile device such as a mobile phone or smartphone that can be communicatively and/or physically coupled to the HMD 300. In some examples, the mobile device 131 is placed, located or otherwise implemented or operated in conjunction within the HMD 110 or 300 to provide a display that can be used as the display 320, and/or a camera that can be used as the camera 315 of the HMD 110 or 300. The mobile device 131 can additionally or alternatively include hardware and/or software for executing VR applications.

To control the HMD 300, the example processor module 310 of FIG. 3 includes a processor 325 in the form of a microcontroller, a central processing unit (CPU), an ASIC, a digital signal processor (DSP), an FPGA, a graphics processing unit (GPU), etc. programmed or configured to execute machine-readable instructions stored in a memory 330. In some examples, the instructions, when executed, cause the processor 325 to, among other things, change how and when real objects are presented on the display 320 inside the HMD 300 based on projected physical movement of the user relative to the real objects. In some examples, more than one processor 325 and/or memory 330 are provided.

The processor 325 additionally processes images taken by the camera 315 to identify, for example, the locations, dimensions, etc. of real objects in a physical space in which a user is using their HMD. This information can be used to map the real environment in which a user is using their HMD. Additionally or alternatively, other devices can be used to map the locations, dimensions, etc. of real objects in a physical space in which an HMD is being used. In some examples, the map of a physical environment in which a user will use their HMD is pre-scanned, pre-known or otherwise determined a priori. Alternatively and/or additionally, it can be determined in real time as their HMD is worn and moved about.

To communicatively couple the example HMD 300 to other devices such as the devices 131-133 of FIG. 1, the example HMD 300 of FIG. 3 includes a communication module 335. Example communication modules 335 implement communication signals and/or protocols such as Bluetooth®, Wi-Fi®, and universal serial bus (USB).

To record data and/or signals representative of actual movement, the example processor module 310 of FIG. 3 includes a movement tracker 340. The movement tracker 340 of FIG. 3 may record, for example, tracking information determined by the HMD 310, and/or tracking information determined by other devices such as the example devices 131-133. Example tracking information includes three dimensions of freedom (3DoF) and six degrees of freedom (6DoF) tracking data. Tracking information may be determined using any number and/or type(s) of emitters, sensors and/or cameras. The actual movement tracking data is representative of actual (e.g., physical, real, non-virtual, etc.) movement of a user, an HMD, a handheld controller, a limb, a head, a hand, a foot, a torso, etc. In some examples, the actual movement tracking data is captured in 3D.

To project movement, the example processor module 310 of FIG. 3 includes a movement projector 345. The example movement projector 345 of FIG. 3 determines one or more characteristics of actual movement (e.g., past movement, movement that has already occurred, etc.) based on the actual movement data collected by the movement tracker 345. Example characteristics include shape of a trajectory or vector (line, curve, radius of curve, etc.) velocity, acceleration, etc. The shape of a trajectory may be determined using, for example, a curve fitting algorithm or method.

Based on the determined characteristics, the movement projector 345 projects (e.g., predicts, estimates, determines, etc.) movement (e.g., future movement, movement to come, movement that has not yet occurred, etc.). For example, if actual movement has occurred most recently along a linear trajectory at a velocity of X, then an example projected movement would be along that linear trajectory at a distance of (X multiplied by Time) from the current location, where Time is the amount of time (e.g., 0.5 second) over which projections are made. Herein, the time intervals over which projections are made are referred to as projection intervals (or projection time periods) for sake of discussion. Projections may be similarly made for trajectories of other shapes, as well as considering other factors, such as acceleration. When the end of a projection interval (e.g., each 0.5 seconds) is actually reached (e.g., interval time has elapsed), the process is repeated with the projected movement data discarded and replaced by additional actual movement data. Movement projections can be made in two-dimensions (2D) or 3D.

In some implementations, the movement projector 345 additionally considers the movement of a handheld controller relative to an HMD. For example, when a user swings their hand about their body as they move (e.g., walk, run, etc.). In such examples, a projected movement trajectory would be computed for each of the HMD and the controller.

To project contact, the example processor module 310 of FIG. 3 includes a contact projector 350. The example contact projector 350 of FIG. 3 compares projected movement data determined by the example movement projector 345 with locations and characteristics of real objects to determine whether the user is going to pass close enough to a real object that the real objected should be displayed in an at least partially visible state inside the HMD 300. In examples where a projected movement trajectory is computed for each of an HMD and controller, each of the trajectories could be considered relative to the locations of real objects. In some examples, time rather than distance can be used to trigger the display of a real object. For example, assuming a prediction interval of 2 seconds, and a user's reaction time of 1 second, then any contact that may occur between now to and one second from now should be at least partially shown.

In some implementations, contact projection accommodates what is happening in a VR application. For example, if a VR application has an object or target that a user tries to reach, contact projection might have a larger threshold criteria in a direction toward that object or target than other directions. In other directions, if a user is moving toward such an object or target it may be more likely that they will accelerate their movement in that direction and, thus, a larger criteria threshold may be used. For example, suppose that there are two physical objects—a chair to the user's left and a table to the user's right—in the room with the user. Suppose further that the user is moving toward the chair. In this case, the contact projector 350 generates projected data indicating that the user will likely collide with the chair in three seconds. In this case, if the time threshold is three seconds then an image of the chair may be displayed in the VR environment. Further, because it is unlikely that the user will suddenly turn around to make contact with the table, the time threshold to display the table may be set to one second instead of three seconds.

Figure 4A:
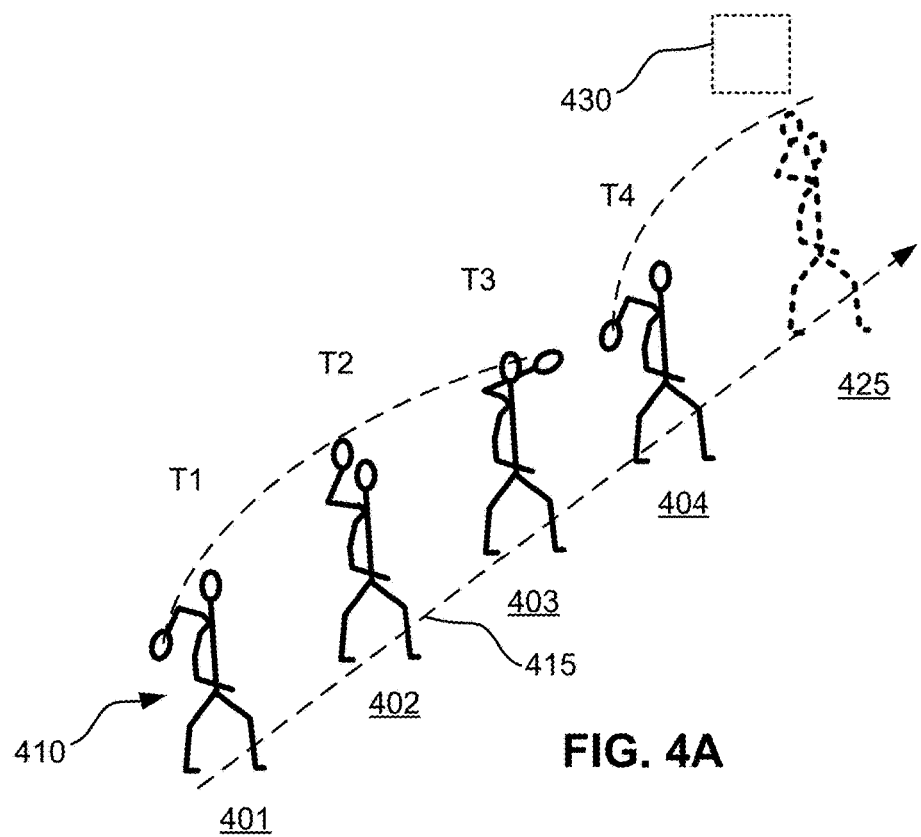
FIG. 4A is a perspective view of an example operation of the examples disclosed herein.
Figure 4B:
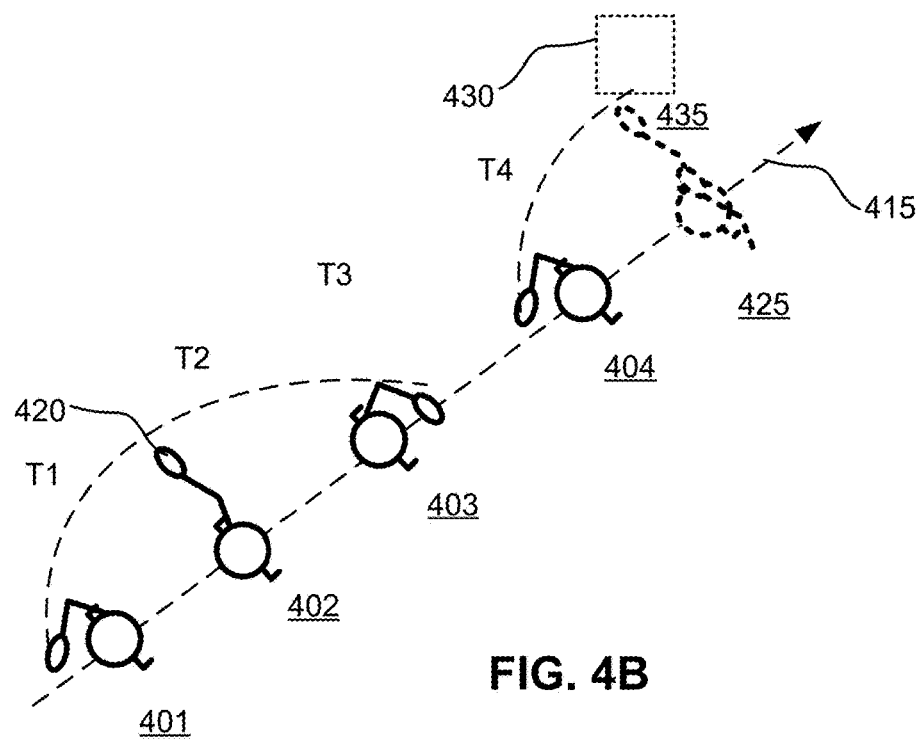
FIG. 4B is a top view of the example operation of FIG. 4A.

As an example, turn to FIGS. 4A and 4B. FIG. 4A is a perspective view of a sequence of actual positions 401, 402, 403 and 404 (in a physical world) of a person 410 at respective times T1, T2, T3 and T4. In FIGS. 4A and 4B, a user is wearing an HMD and interacting with VR environment they are viewing in their HMD as they move. FIG. 4B is a top view of the sequence of locations 401-404 of FIG. 4A. Taken together, the actual positions 401-404 and times T1-T4 represent an actual movement of the person 410 along a linear trajectory 415 while swinging a fly swatter 420 about themselves. For clarity of illustration, only one instance of the person 410 and the fly swatter 420 are designated.

Between times T1 and T4, the movement tracker 340 collects data representing motion of the person 410 along the trajectory 415 using a sensor included in the HMD 110 or 300, and motion of the fly swatter 420 based on the handheld controller 112. Motion of the HMD 110 or 300 may be, for example, determined using a forward-facing camera included in the HMD, and/or emitters included in the HMD that are sensed by sensors (not shown) of the VR system 100 of FIG. 1

At time T4 in FIGS. 4A and 4B, the movement projector 345 processes some or all of the data collected by the movement tractor 340 and determines that actual movement has been occurring along the linear trajectory 415 at a velocity of X. The movement projector 345 accordingly projects that at a time T5 the person will continue to move along the linear trajectory 415 at the same velocity because the velocity has been reasonably consistent. Thus, at time T5, the movement projector 345 projects they will be at location 425.

The movement projector 345 also processes at least some of the data and determines that the fly swatter 420 was most recently swung in an arc, and that the fly swatter has been repositioned to be swung again at a fly. The movement projector 345 accordingly projects that at the time T5 the person will be mid-swing at position 425. Taken together, the movement projector 345 projects that the person will at time T5, be at location 425 in mid-swing with the fly swatter 420.

The contact projector 350 compares the predicted location 425 of the HMD at time T5 with the location of a real object 430 in the physical space in which the HMD is being used. The contact projector 350 also compares the predicted location 435 of the fly swatter 420 at time T5 with the location of the real object 430. As seen best in FIG. 4B, the fly swatter at projected location 435 is near to (e.g., within a threshold distance) the real object 430. Accordingly, the real object 430 is at least partially displayed in the VR environment displayed inside the HMD. Because the HMD is projected to be relatively far from the real object 430, the HMD does not trigger display of the real object 430.

In some implementations, projection intervals are short enough that only a single projected movement data point is computed for each interval, and only single comparisons relative to real object locations need to be made. By shortening the projection interval, the complexity of movement projection can be reduced as projected movement data will be relatively close to the most recent actual movement data. In such instances, low order extrapolation may be used. However, consideration may need to be given to a sufficiently long interval that allows the user to react to the change in displayed state of a real object.

In some implementations, time is used to trigger the display of a real object. For example, assuming a prediction interval of 2 seconds, and a user reaction time of 1 second, any contact that may occur within time NOW to time NOW plus 1 second should be shown in an at least partially visible state. In some examples, time used to project contact is adapted based on velocity of actual movement. For instance, reaction time may be assumed to increase as the person moves faster to avoid the real object being at least partially displayed too late, or to decrease as the person moves slower to avoid the real object being at partially displayed too early.

In some implementations, probability of contact is utilized. For example, if the likelihood of contact is greater than X%, then the real object should be displayed in an at least a partially visible state.

In some implementations, movement projection is not utilized. Instead, actual positions satisfying an actual distance from a real object triggers the display of the object in an at least partially displayed state.

In some implementations, the movement tracker 340, the movement projector 345 and the contact projector 350 execute without the knowledge of application developers so that real object contact information can be provided at the system level in an HMD. In this way, real object contact information can be provided without requiring the effort, involvement, knowledge or approval of application developers. In this way, a user obtains advantage of the improvements disclosed herein for all of their VR applications.

In some implementations, the movement projector 345 and contact projector 350 are combined into and realized by a neural network or artificial intelligence (AI) module 360. In general, the AI module 360 of FIG. 3 uses unstructured learning to learn causal relationships between inputs and outputs (e.g., an AI model). The learned relationships can then be applied to actual movement data inputs to determine projected movement data. The learned relationships can be learned by having the AI module 360 trained using sets of actual movement data captured at {T1,T0, . . . } as inputs and actual movement data captured at T2 as outputs. Subsequent data sets include data captured at {T2,T1, . . . } and T3; data captured at {T3,T2,T1, . . . } and T4; etc. In use, actual movement data is input to the AI module 360, and outputs represent which real objects to display in an at least partially displayed state.

In some implementations, a portion of the processor module 310 is implemented separate from the HMD 300. For example, the movement tracker 340, the movement projector, the contact projector 350 and/or the AI module 350 may be implemented by any of the devices 131-133. Information regarding which real objects should be displayed in an at least partially displayed state could be relayed to the HMD 300.

Figure 5:
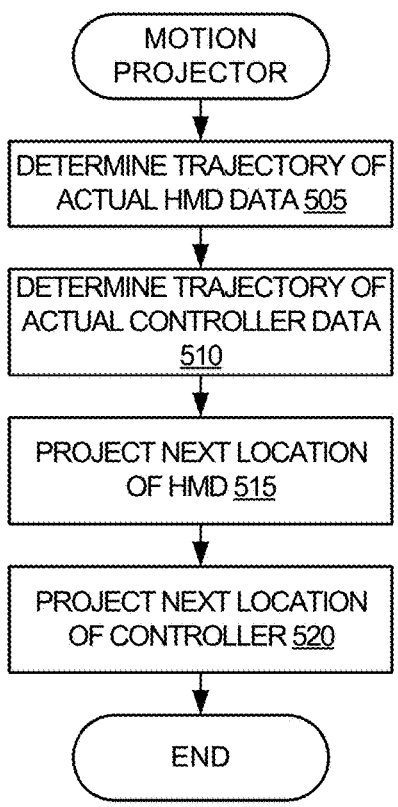
FIG. 5 is a flowchart representing an example method that may be used to implement a motion projector.
Figure 8:
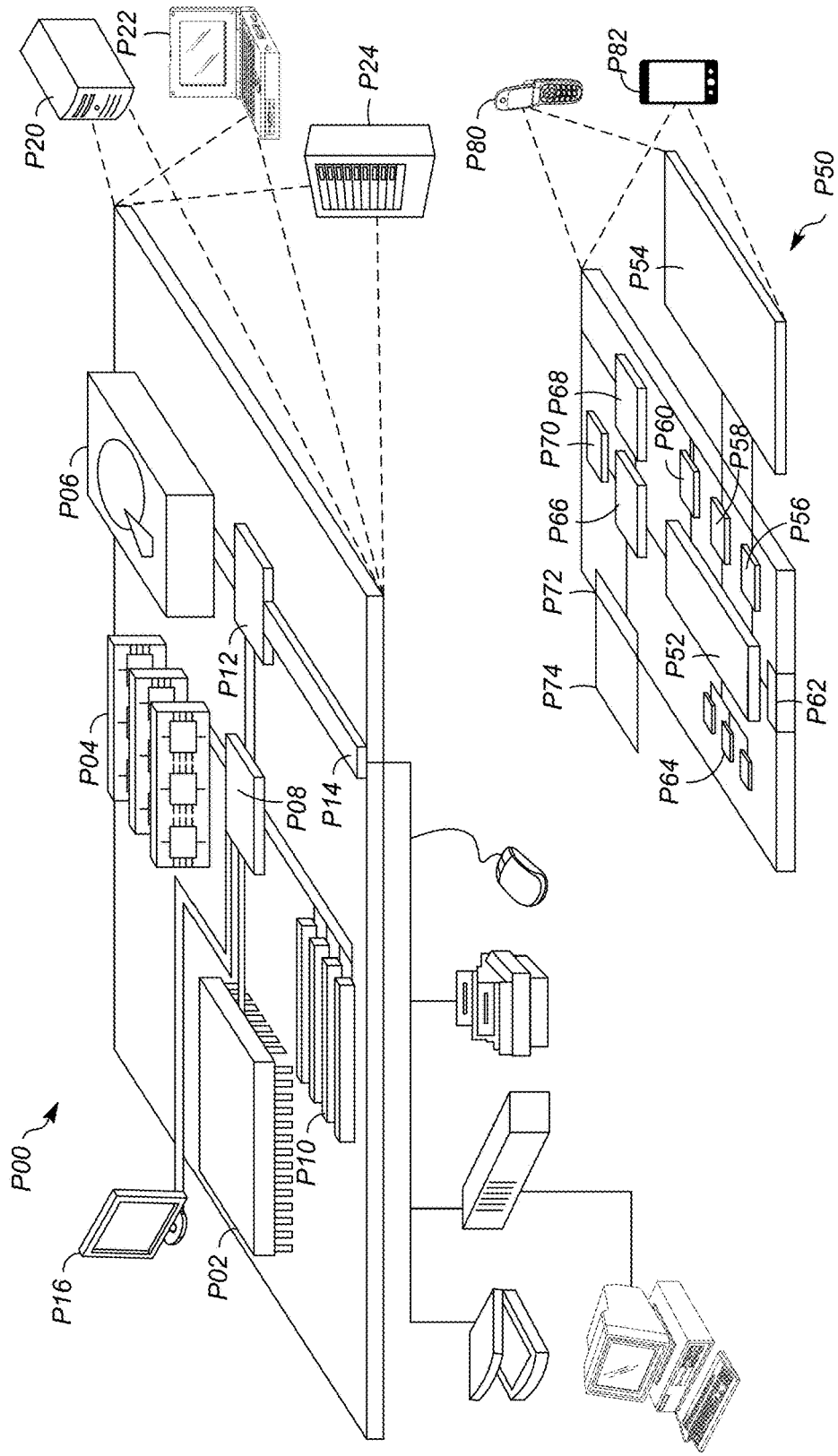
FIG. 8 is a block diagram of an example computer device and an example mobile computer device, which may be used to implement the examples disclosed herein.

FIG. 5 is a flowchart of an example method that may, for example, be implemented as machine-readable instructions carried out by one or more processors, such as the example processors P00 and P50 of FIG. 8, to implement the example motion projectors disclosed herein. The example method of FIG. 5 includes analyzing or processing actual HMD movement data to determine an actual HMD trajectory (block 505), and analyzing or processing actual controller movement data to determine an actual controller trajectory (block 510). A projection of an HMD location (block 515) and a controller location (block 520). Additionally or alternatively, limbs, hands, feet, heads, etc. not necessary associated with a controller may be tracked. Control then exits from the example method of FIG. 5.

Figure 6:
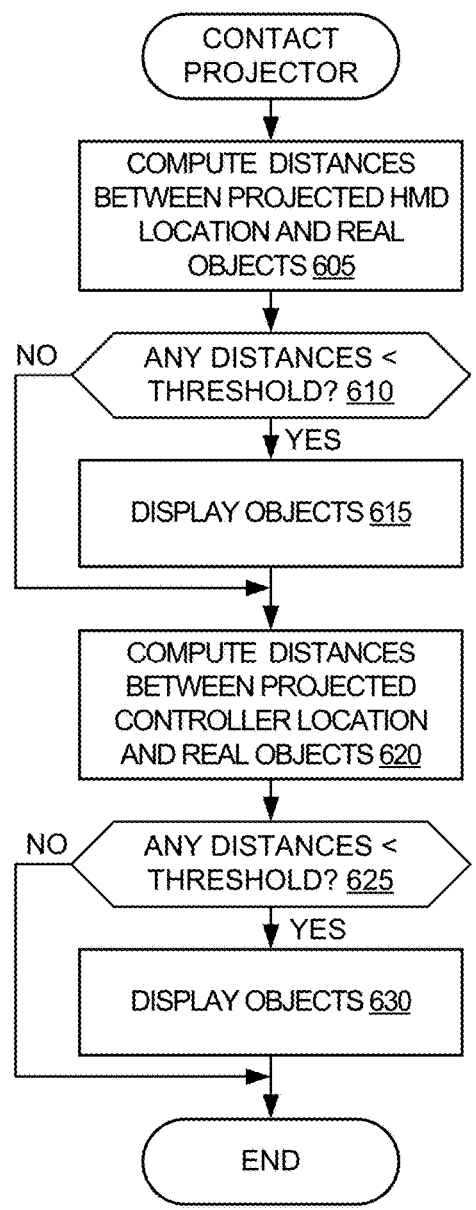
FIG. 6 is a flowchart representing an example method that may be used to implement a contact projector.

FIG. 6 is a flowchart of an example method that may, for example, be implemented as machine-readable instructions carried out by one or more processors, such as the example processors P00 and P50 of FIG. 8, to implement the example contact projectors disclosed herein. The example method of FIG. 6 includes computing distances between a projected HMD location and the location(s) of real objects (block 605). If any distances satisfy a threshold (e.g., less than, less than or equal, equal to, etc.) (block 610), the real objects satisfying the threshold are displayed in an at least partially displayed state (block 615).

Distances between a projected controller location and the location(s) of real objects are computed (block 620). If any distances are less than a threshold (block 625), the real objects satisfying the threshold are displayed in an at least partially displayed state (block 630). Control then exits from the example method of FIG. 6.

As disclosed above, other criteria (e.g., time, percentage, etc.) may additionally or alternatively be used to determine which real objects to display in an at least partially displayed state.

Figure 7:
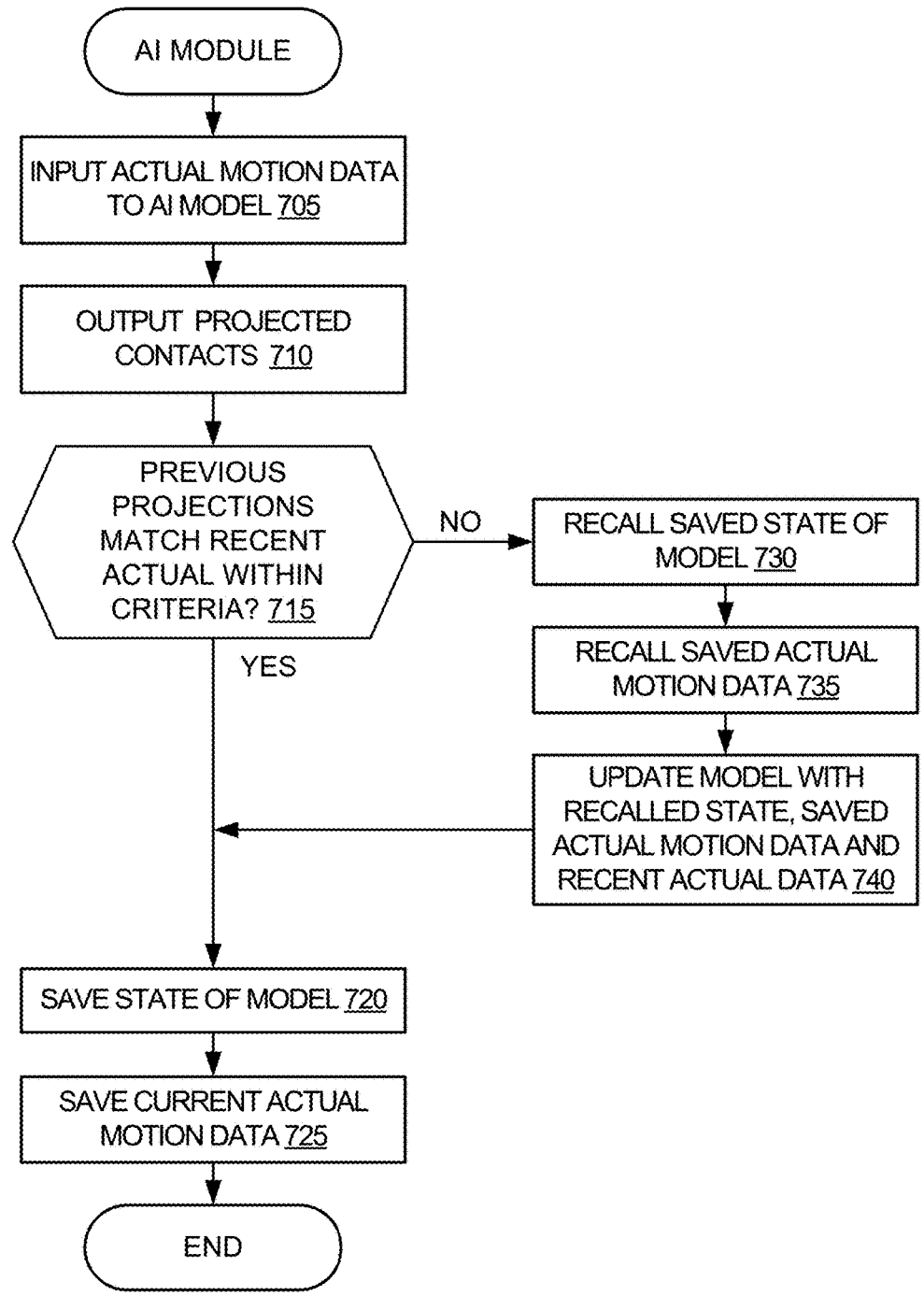
FIG. 7 is a flowchart representing an example method that may be used to implement an artificial intelligence (AI) module.

FIG. 7 is a flowchart of an example method that may, for example, be implemented as machine-readable instructions carried out by one or more processors, such as the example processors P00 and P50 of FIG. 8, to implement the example AI modules disclosed herein. In addition to projecting contacts, the example method of FIG. 7 includes adapting the learned relationships as the AI module is used. The example method of FIG. 7 includes inputting actual motion data to the AI model (block 705) and outputting project contact information (block 710).

If previous projections matched actual projections satisfy a criteria (e.g., number of missed contacts, number of false contacts, contacts displayed too late, contacts displayed too early, etc.) (block 715), the current state of the AI model is saved (block 720) and current actual motion data is saved (block 725). Control then exits from the example method of FIG. 7.

If previous projections did not match actual projections within the criteria (block 715), the saved state of the AI model (block 730) and the actual motion data (block 735) are recalled. The AI module is updated using the recalled data as inputs and recent actual data as outputs (block 740). Control then exits from the example method of FIG. 7.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by the example processor platforms P00 and P50 of FIG. 8, and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. Any of the elements and interfaces disclosed herein may, for example, be implemented as machine-readable instructions carried out by one or more processors. A processor, a controller and/or any other suitable processing device such as those shown in FIG. 8 may be used, configured and/or programmed to execute and/or carry out the examples disclosed herein. For example, any of these interfaces and elements may be embodied in program code and/or machine-readable instructions stored on a tangible and/or non-transitory computer-readable medium accessible by a processor, a computer and/or other machine having a processor, such as that discussed below in connection with FIG.

8. Machine-readable instructions comprise, for example, instructions that cause a processor, a computer and/or a machine having a processor to perform one or more particular processes. The order of execution of methods may be changed, and/or one or more of the blocks and/or interactions described may be changed, eliminated, sub-divided, or combined. Additionally, they may be carried out sequentially and/or carried out in parallel by, for example, separate processing threads, processors, devices, discrete logic, circuits, etc.

The example methods disclosed herein may, for example, be implemented as machine-readable instructions carried out by one or more processors. A processor, a controller and/or any other suitable processing device such as that shown in FIG. 8 may be used, configured and/or programmed to execute and/or carry out the example methods. For example, they may be embodied in program code and/or machine-readable instructions stored on a tangible and/or non-transitory computer-readable medium accessible by a processor, a computer and/or other machine having a processor, such as that discussed below in connection with FIG. 8. Machine-readable instructions comprise, for example, instructions that cause a processor, a computer and/or a machine having a processor to perform one or more particular processes. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

As used herein, the term "computer-readable medium" is expressly defined to include any type of computer-readable medium and to expressly exclude propagating signals. Example computer-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, the VR system 100 may include any number of VR content systems 140 storing content and/or VR software modules (e.g., in the form of VR applications 144) that can generate, modify, and/or execute VR scenes. In some examples, the devices 110, 112 and 131-133 and the VR content system 140 include one or more processors and one or more memory devices, which can execute a client operating system and one or more client applications. The HMD 110, the controller 112, the other devices 131-133 or the VR content system 140 may be implemented by the example computing devices P00 and P50 of FIG. 8.

The VR applications 144 can be configured to execute on any or all of devices 110, 112 and 131-133. The HMD 110 can be connected to devices 131-133 to access VR content on VR content system 140, for example. Device 131-133 can be connected (wired or wirelessly) to HMD 110, which can provide VR content for display. A user's VR system can be HMD 110 alone, or a combination of device 131-133 and HMD 110.

The HMD 110 may represent a VR HMD, glasses, an eyepiece, or any other wearable device capable of displaying VR content. In operation, the HMD 110 can execute a VR application 144 that can playback received, rendered and/or processed images for a user. In some instances, the VR application 144 can be hosted by one or more of the devices 131-133.

In some implementations, one or more content servers (e.g., VR content system 140) and one or more computer-readable storage devices can communicate with the computing devices 110 and 131-134 using the network 120 to provide VR content to the devices 110 and 131-134.

In some implementations, the mobile device 131 can execute the VR application 144 and provide the content for the VR environment. In some implementations, the laptop computing device 132 can execute the VR application 144 and can provide content from one or more content servers (e.g., VR content server 140). The one or more content servers and one or more computer-readable storage devices can communicate with the mobile device 131 and/or laptop computing device 132 using the network 120 to provide content for display in HMD 106.

In the event that HMD 106 is wirelessly coupled to device 102 or device 104, the coupling may include use of any wireless communication protocol. A non-exhaustive list of wireless communication protocols that may be used individually or in combination includes, but is not limited to, the Institute of Electrical and Electronics Engineers (IEEE®) family of 802.x standards a.k.a. Wi-Fi or wireless local area network (WLAN), Bluetooth, Transmission Control Protocol/Internet Protocol (TCP/IP), a satellite data network, a cellular data network, a Wi-Fi hotspot, the Internet, and a wireless wide area network (WWAN).

In the event that the HMD 106 is electrically coupled to device 102 or 104, a cable with an appropriate connector on either end for plugging into device 102 or 104 can be used. A non-exhaustive list of wired communication protocols that may be used individually or in combination includes, but is not limited to, IEEE 802.3x (Ethernet), a powerline network, the Internet, a coaxial cable data network, a fiber optic data network, a broadband or a dialup modem over a telephone network, a private communications network (e.g., a private local area network (LAN), a leased line, etc.).

A cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the electrical coupling can include a cable with an appropriate connector on either end for plugging into the HMD 106 and device 102 or device 104. For example, the cable can include a USB connector on both ends. The USB connectors can be the same USB type connector or the USB connectors can each be a different type of USB connector. Either end of a cable used to couple device 102 or 104 to HMD 106 may be fixedly connected to device 102 or 104 and/or HMD 106.

FIG. 8 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Further Implementations are Summarized in the Following Examples:

EXAMPLE 1

A method comprising: projecting a movement of a person in a virtual reality (VR) environment based on an actual movement of the person; and if the projected movement satisfies a threshold relative to a position of a real object in a physical space in which the VR environment is implemented, changing a representation of the real object from an un-displayed state to an at least partially displayed state in the VR environment.

EXAMPLE 2

The method of example 1, further comprising receiving data representative of the actual movement of the person, wherein the projecting is based on the data.

EXAMPLE 3

The method of example 2, wherein the data represents at least one of an actual direction of movement, an actual velocity of movement, and/or an actual acceleration of movement.

EXAMPLE 4

The method of one of examples 1 to 3, wherein the real object in the un-displayed state is not visible to the person.

EXAMPLE 5

The method of one of examples 1 to 4, wherein the real object in the displayed state is partially visible to the person.

EXAMPLE 6

The method of example 5, wherein the real object when partially visible is at least one of partially opaque, partially transparent, displayed in a wire frame representation, and/or allows another object in the VR environment to be at least partially viewed through the real object.

EXAMPLE 7

The method of one of examples 1 to 6, wherein the threshold represents a distance between the projected movement and the real object.

EXAMPLE 8

The method of one of examples 1 to 7, wherein the threshold represents a time to reach the real object.

EXAMPLE 9

The method of one of examples 1 to 8, wherein projecting the movement of the person comprises: projecting a movement trajectory of the person; and determining a movement along the projected movement trajectory based on a projected velocity and/or a projected acceleration.

EXAMPLE 10

The method of example 9, wherein the threshold represents a distance between the projected movement trajectory and the real object.

EXAMPLE 11

The method of example 9, wherein projecting the movement of the person further comprises: projecting a movement trajectory for a portion of the person, and determining, about the projected movement trajectory of the person, a projected movement of the portion of the person; and wherein the threshold represents a distance between the projected movement of the portion and the real object.

EXAMPLE 12

The method of one of examples 1 to 11, wherein projecting the movement of the person comprises processing the actual movement of the person with at least one of an artificial intelligence module and/or a neural network.

EXAMPLE 13

The method of example 12, further comprising training at least one of the artificial intelligence module and/or the neural network using sets of actual movement data and projected movement data.

EXAMPLE 14

An electronic apparatus configured to projecting a movement of a person in a virtual reality (VR) environment based on an actual movement of the person; and if the projected movement satisfies a threshold relative to a position of a real object in a physical space in which the VR environment is implemented, changing a representation of the real object from an un-displayed state to an at least partially displayed state in the VR environment.

EXAMPLE 15

The electronic apparatus of Example 14, wherein the controlling circuitry is further configured to receive data representative of the actual movement of the person, wherein the projecting is based on the data.

EXAMPLE 16

The electronic apparatus of one of examples 14 and 15, wherein the real object in the un-displayed state is not visible to the person.

EXAMPLE 17

The electronic apparatus of one of examples 14-16, wherein the real object in the displayed state is partially visible to the person.

EXAMPLE 18

The electronic apparatus of one of examples 14-17, wherein the threshold represents a distance between the projected movement and the real object.

EXAMPLE 19

The electronic apparatus of one of examples 14-17, wherein the threshold represents a time to reach the real object.

EXAMPLE 20

A non-transitory machine-readable media storing machine-readable instructions that, when executed, cause a machine to at least perform the method of one of examples 1 to 13.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
projecting a movement of a person in a virtual reality (VR) environment based on an actual movement of the person;
determining that the projected movement satisfies a threshold relative to a position of a real object in a physical space in which the VR environment is implemented; and
changing a representation of the real object from an un-displayed state to an at least partially displayed state in the VR environment based on the determination of the satisfied threshold,
the projecting the movement of the person including:
projecting a movement trajectory of at least a portion of the person, the movement trajectory being along an arc and based at least in part on collected contact data representing previous contact information; and
determining a movement along the projected movement trajectory based on at least one of a projected velocity or a projected acceleration.

2. The method of claim 1, further comprising receiving data representative of the actual movement of the person, wherein the projecting is based on the data.

3. The method of claim 2, wherein the data represents at least one of an actual direction of movement, an actual velocity of movement, or an actual acceleration of movement.

4. The method of claim 1, wherein the real object in the un-displayed state is not visible to the person.

5. The method of claim 1, wherein the real object in the displayed state is partially visible to the person.

6. The method of claim 5, wherein the real object when partially visible is at least one of displayed in a wire frame representation and allows another object in the VR environment to be at least partially viewed through the real object.

7. The method of claim 1, wherein the threshold represents a distance between the projected movement and the real object.

8. The method of claim 1, wherein the threshold represents a time to reach the real object.

9. The method of claim 1, wherein the threshold represents a distance between the projected movement trajectory and the real object.

10. The method of claim 1, wherein the threshold represents a distance between the projected movement of the portion and the real object.

11. The method of claim 1, wherein projecting the movement of the person comprises processing the actual movement of the person with at least one of an artificial intelligence module or a neural network.

12. The method of claim 11, further comprising training at least one of the artificial intelligence module or the neural network using sets of actual movement data and projected movement data.

13. The method of claim 1, wherein the projecting the movement trajectory includes generating a predicted position of an object connected to the portion of the person at a point along the arc.

14. An electronic apparatus, comprising:
a memory; and
controlling circuitry coupled to the memory, the controlling circuitry being configured to:
project a movement of a person in a virtual reality (VR) environment based on an actual movement of the person;
determine that the projected movement satisfies a threshold relative to a position of a real object in a physical space in which the VR environment is implemented;
change a representation of the real object from an un-displayed state to an at least partially displayed state in the VR environment based on the determination of the satisfied threshold;
wherein the controlling circuitry configured to project the movement of the person is further configured to:
project a movement trajectory of at least a portion of the person, the movement trajectory being along a curve and based at least in part on collected contact data representing previous contact information; and
determine a movement along the projected movement trajectory based on at least one of a projected velocity or a projected acceleration.

15. The electronic apparatus of claim 14, wherein the controlling circuitry is further configured to receive data representative of the actual movement of the person, wherein the projecting is based on the data.

16. The electronic apparatus of claim 14, wherein the real object in the un-displayed state is not visible to the person.

17. The electronic apparatus of claim 14, wherein the real object in the displayed state is partially visible to the person.

18. The electronic apparatus of claim 14, wherein the threshold represents a distance between the projected movement and the real object.

19. The electronic apparatus of claim 14, wherein the threshold represents a time to reach the real object.

20. A non-transitory machine-readable media storing machine-readable instructions that, when executed, cause a machine to perform a method, comprising:
projecting a movement of a person in a virtual reality (VR) environment based on an actual movement of the person;
determining that the projected movement satisfies a threshold relative to a position of a real object in a physical space in which the VR environment is implemented;
changing a representation of the real object from an un-displayed state to an at least partially displayed state in the VR environment based on the determination of the satisfied threshold,
the projecting the movement of the person includes:
projecting a movement trajectory of at least a portion of the person, the movement trajectory being along a nonlinear portion and based at least in part on collected contact data representing previous contact information; and
determining a movement along the projected movement trajectory based on at least one of a projected velocity or a projected acceleration.

* * * * *